United States Patent [19]
Yoneta et al.

[11] Patent Number: 5,272,526
[45] Date of Patent: Dec. 21, 1993

[54] TELEVISION CONFERENCE SYSTEM

[75] Inventors: Hajime Yoneta, Tokyo; Yasushi Ogino, Kanagawa, both of Japan

[73] Assignee: Sony Corporation, Tokyo, Japan

[21] Appl. No.: 705,336

[22] Filed: May 24, 1991

[30] Foreign Application Priority Data

May 30, 1990 [JP] Japan .................. 2-140554

[51] Int. Cl.⁵ .................... H04N 7/15; H04N 3/56
[52] U.S. Cl. ........................ 358/85; 379/53; 379/204
[58] Field of Search ............... 379/53, 54, 202, 203, 379/204; 358/85, 86, 84; 455/3.1, 3.3, 4.2, 5.1, 6.2, 4.1; 370/62

[56] References Cited

U.S. PATENT DOCUMENTS

| | | | |
|---|---|---|---|
| 4,516,156 | 5/1985 | Fabris et al. | 379/53 |
| 4,642,805 | 2/1987 | Dumas et al. | 379/28 |
| 4,677,685 | 6/1987 | Kurisu | 455/4.1 |
| 4,758,887 | 7/1988 | Engel et al. | 379/53 |
| 4,796,293 | 1/1989 | Blinken et al. | 379/202 |
| 4,847,829 | 7/1989 | Tompkins et al. | 370/62 |
| 4,955,048 | 9/1990 | Iwamura et al. | 379/53 |
| 4,961,211 | 10/1990 | Tsugane et al. | |
| 4,965,819 | 10/1990 | Kannes | 379/53 |
| 4,987,492 | 1/1991 | Stults et al. | 379/53 |
| 5,107,256 | 4/1992 | Ueno et al. | 358/86 |

FOREIGN PATENT DOCUMENTS

| | | | |
|---|---|---|---|
| 0309355 | 9/1987 | European Pat. Off. | 379/53 |
| 0351757A2 | 1/1990 | European Pat. Off. | |
| 60-116293 | 6/1985 | Japan . | |
| 62-245889 | 10/1987 | Japan . | |
| 2227625(A) | 10/1988 | United Kingdom | 379/53 |

OTHER PUBLICATIONS

Patent Abstracts of Japan, vol. 13, No. 181 (E-750), 27 Apr. 1989 & JP-A-0997 791 (NEC Corp.), Jan. 11, 1989 & US-A-4 961 211.

Telecom 87 Report (Journal of Electronic Engineering), 1987, Tokyo, Japan, pp. 45-46: Yasuhiro Higashide et al.: 'Teleconference System'.

*Primary Examiner*—Reinhard J. Eisenzopf
*Assistant Examiner*—Lisa Charouel
*Attorney, Agent, or Firm*—Philip M. Shaw, Jr.

[57] ABSTRACT

A television conference system in which video and audio information generated in each hall are transmitted and reproduced in the other hall and further in which a plurality of personal terminals having at least a keyboard, or other information input device, and a monitor are provided in the first and second conference halls so that the attendees can transmit and receive personal electronic messages from one terminal to another in each hall.

6 Claims, 2 Drawing Sheets

TELEVISION CONFERENCE SYSTEM

BACKGROUND OF THE INVENTION

1. Field of the Invention the present invention relates to a television conference system in which video information and audio information are transmitted between first and second conference halls.

2. Description of the Prior Art

Conventionally, various kinds of television conference systems have been proposed According to a conventional television conference system, in general, video information is displayed by a monitor and audio information is transmitted by a speaker such as is described in Japanese Patent Publication Unexamined No. 60-116293 or No. 62-245889.

In the conventional television conference system, video information and audio information are transmitted between conference halls. The information transmitted in a particular direction is typically representative of the total activity in the originating conference hall. That is, typical systems have no capability for private information exchange among attendee of the conference or between the attendees of the conference and non-attendants Accordingly, with the conventional system it is impossible for a particular attendee send a message to another particular attendee in a private manner such that the message cannot be observed by persons other than the particular attendees. On the other hand, there is a problem such that a conference is interrupted in the case where a secretary contacts an attendee regarding an emergency matter.

OBJECTS AND SUMMARY OF THE INVENTION

It is, therefore, an object of the invention to provide a television conference system in which information can be ex changed between at least two arbitrary conference attendees.

To accomplish the object of the invention, there is provided a television conference system in which video information and audio information are transmitted between a first conference hall and a second conference hall, comprising: a first video camera and a first microphone provided in the first conference hall; a second video camera and a second microphone provided in the second conference hall, a first monitor means provided in the first conference hall, for monitoring video information and audio information sent from the second video camera and the second microphone; a second monitor means provided in the second conference hall, for monitoring video information and audio information sent from the first video camera and the first microphone; a plurality of personal terminals provided in the first and second conference halls, each personal terminal having at least information input means, and also having monitor means for monitoring information signals; and control means for supplying an information signal derived from any of the plurality of personal terminals to one or more other specified personal terminals.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
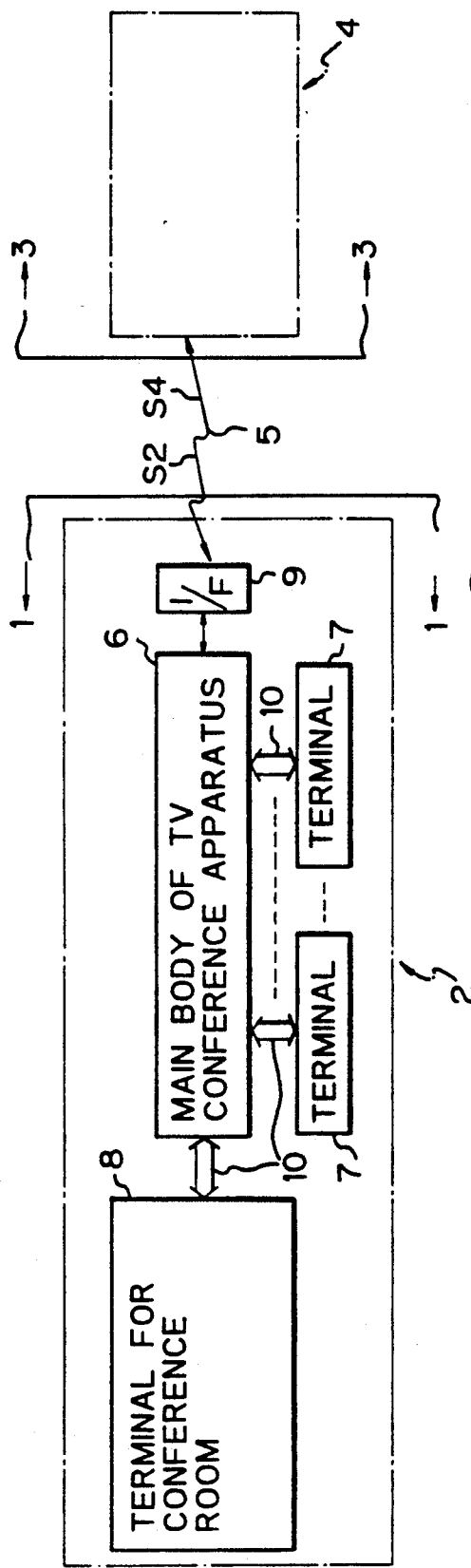
FIG. 1 is a block diagram showing an embodiment of a television conference system according to the present invention.

An embodiment of the present invention will be described with reference to FIGS. 1 to 3. Referring to FIG. 1, a television conference system comprises; a conference hall system 2 provided in a conference hall 1; and another conference hall system 4 provided in another conference hall 3. The conference hall systems 2 and 4 are connected to each other by a transmission line 5.

The conference hall system 2 consists mainly of a television conference apparatus main body 6, personal terminals 7, a conference room terminal 8, and an interface 9. The personal terminals 7, conference room terminal 8, and the like are connected to the television conference apparatus main body 6 by system buses 10. Since the other conference hall system 4 is constructed and operates in substantially the same manner as the conference hall system 2, the overlapped explanations are omitted The television conference apparatus main body 6 comprises various kinds of control means including, for example, a codec (not shown) and has a function to control the whole operation of the conference hall system 2. Control signals formed by the television conference apparatus main body 6 are supplied to the personal terminals 7, conference room terminal 8, and the other conference hall system 4 and those are controlled according to the control signal On the other hand, video signals from video cameras of the conference terminal 8 mentioned above, audio signals from microphones, and message data (with ID numbers, which are supplied from the above personal terminals 7, added) are mixed by a control circuit (not shown) provided in the television conference apparatus main body 6 and the mixed data is supplied to the codec (not shown).

The codec of the television conference apparatus main body 6 comprises an encoder and a decoder. The encoder of the codec encodes the signal in which the video signal in the conference hall 1, the audio signal in the conference hall 1, and the message data (with ID numbers of a transmitting person and a receiving person added) are mixed into a signal S2 having a predetermined format The encoded signal S2 is transmitted to the other conference hall system 4 through the interface 9 and transmission line 5 under the control of a the control circuit (not shown) provided in the television conference apparatus main body 6.

On the other hand, the decoder of the codec of the television conference apparatus main body 6 receives and decodes a signal S4 which is encoded by an encoder of the television conference apparatus main body of the other conference hall system 4. It is required that the system 4 create and transmit the signal S4 using a control circuit (not shown) The decoded signal from the decoder is separated into a video signal, an audio signal, and message data (with ID numbers, as discussed above) by the control circuit provided in the television conference apparatus main body 6. The video and audio signals derived are supplied to the conference room terminal 8. The video signal, audio signal, message data, and the like obtained are supplied to each of the personal terminals 7.

Figure 2:
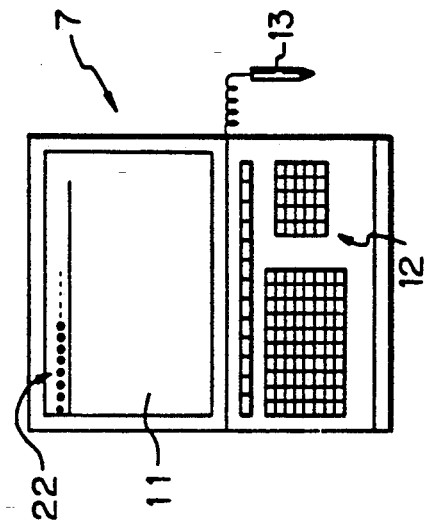
FIG. 2 is a diagram showing an example of a personal terminal used in the system of FIG. 1.

The personal terminal 7 is as shown in, for example, FIG. 2 and mainly comprises: a monitor section 11 to display a video image; a keyboard section 12 to input data; and a light pen 13. A tablet device having a hand writing input function can be also used as a keyboard section 12 mentioned above. The video signal, which has been decoded and separated from the signal S4, is supplied to the monitor section 11 and a scene of the other conference hall 3 is displayed onto the screen of the monitor section 11.

Figure 3:
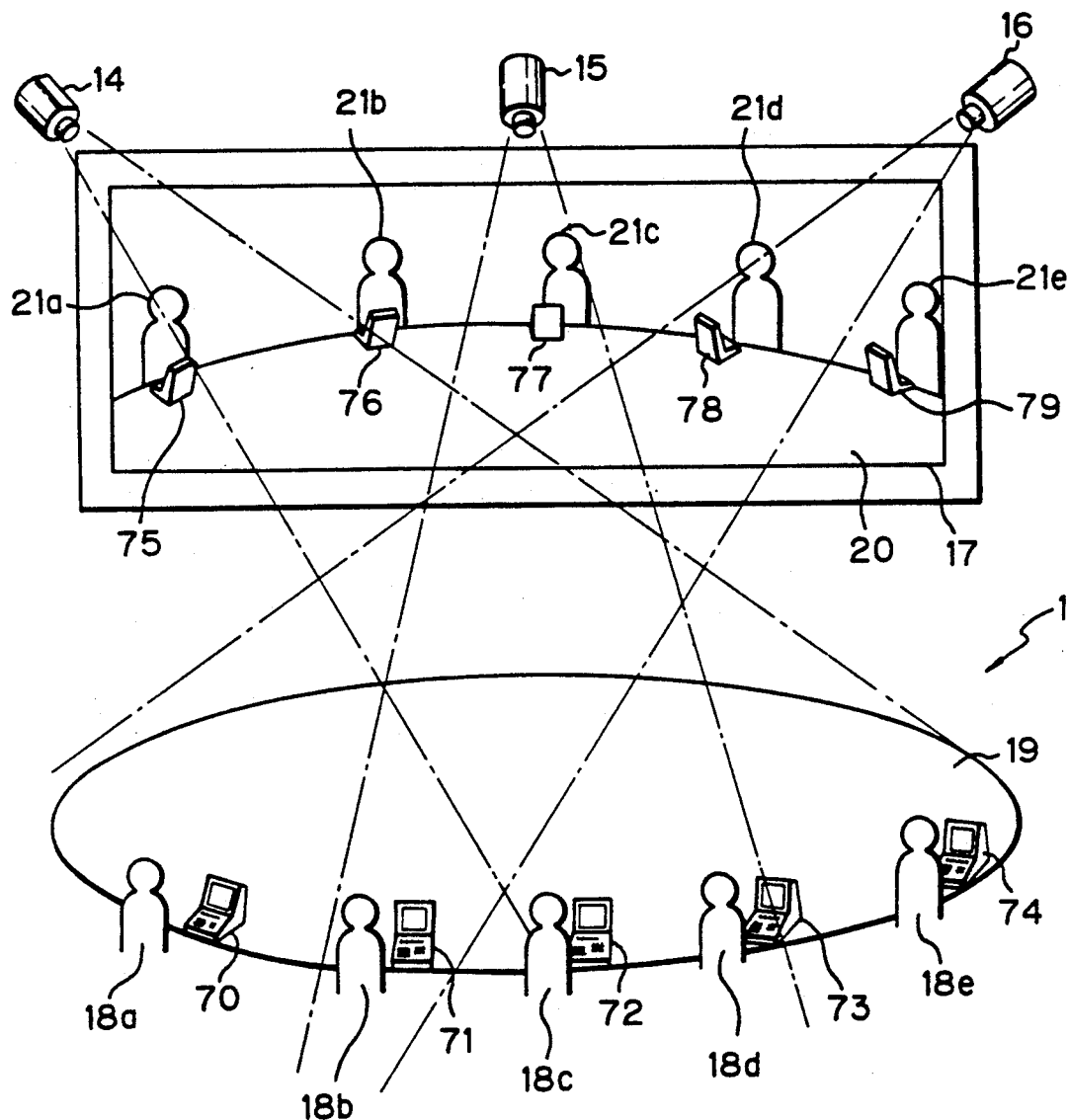
FIG. 3 is a diagram showing a conference hall having the system of FIG. 1.

As shown in FIG. 3, the conference room terminal 8 comprises: video cameras 14 to 16 to image pick-up the scene of the conference hall 1; a monitor 17 of a large screen; a microphone (not shown) to collect voice sounds of attendants 18a to 18e; a speaker (not shown); and the like. The video signal decoded and separated from the signal S4 is supplied to the monitor 17 and the scene of the other conference hall 3 is displayed. A voice sound at the other conference hall 3 is broadcast from the speaker on the basis of the audio signal decoded and separated from the signal S4.

The operation of the television conference system will now be described. As shown in FIG. 3, personal terminals 70 to 74 are equipped on a desk 19 in the conference hall 1 and personal terminals 75 to 79 are also equipped on a desk 20 in the other conference hall 3. Attendees 18a to 18e and 21a to 21e of the conference are seated in front of personal terminals 70 to 74 and 75 to 79, respectively.

The conference hall systems 2 and 5 are set to an operating mode by manipulating the television conference apparatus main bodies 6 of both of the conference hall systems 2 and 4. The scene of the conference hall 1 is image picked up by the video cameras 14 to 16 provided as conference room terminals 8. The scene of the whole conference hall 1 is picked up by a plurality of video cameras 14 to 16. In the example shown in the diagram, the attendees 18c, 18d, and 18e are image picked up by the video camera 14; the attendees 18b, 18c, and 18d are image picked up by the video camera 15; and the attendees 18a and 18b are image picked up by the video camera 16. The video images of three frames derived from video cameras 14, 15 and 16 are synthesized by the control circuit in the television conference apparatus main body 6 and the video signal is thus obtained.

Individual speech of the attendees 18a to 18e is collected by the microphone, and the audio signal is thus obtained. The video signal and the audio signal are mixed by the control circuit (not shown) in the television conference apparatus main body 6. The mixed signal is encoded to the signal S2 by the encoder and is supplied to the other conference hall system 4 through the interface 9 and the transmission line 5.

Similarly, the encoded signal S4 is transmitted to the television conference apparatus main body 6 of the conference hall system 2 through the transmission line 5 by the television conference apparatus main body of the other conference hall system 4. The signal S4 is decoded by the codec in the television conference apparatus main body 6 of the conference hall system 2. The video signal and the audio signal are separated from the decoded signal S4 by the control circuit in the television conference apparatus main body 6 and are supplied to the conference room terminal 8 and the personal terminals 7.

Thus, a whole scene of the other conference hall 3 is displayed as a video image on the monitor 17 of a large screen which is provided in the conference hall 1. The content of the speech in the other conference hall 3 is broadcast from the speaker A scene in which the attendees 21a to 21e in the other conference hall 3 are seated in front of the personal terminals 75 to 79 is displayed onto the screen of the monitor 17. Although not shown, a scene of the conference hall 1 is also similarly displayed as a video image at the other conference hall 3.

In addition, the same scene as that on the monitor 17 is also displayed onto the screen of the monitor section 11 of each of the personal terminals 70 to 74 on the conference has 1 side. In this case, since the same scene is displayed in the monitor 17 and the monitor section 11 of each of the personal terminals 70 to 74, only one of them is used and the other display can be stopped.

When, for example, the attendee 18a in the conference hall 1 wants to send a message to a specific attendee, for instance, the attendee 18d in the same conference hall 1 during the conference in a manner such that the message cannot be known by the attendees 18b, 18c, 18e, and 21a to 21e other than the attendee 18d, the attendee 18a inputs the message and the ID number of the personal terminal 73 of the attendee 128d from the keyboard section 12. In this case, the number of receiving persons can be to one or more. The ID number of the attendant 18a himself as a transmitting person can be also simultaneously input from the keyboard section 12 or can be also automatically added by the personal terminal 70.

Data comprising a message, and ID numbers of the attendee 18a as a transmitting person and the attendee 18d as a terminating person, are processed by the control circuit in the television conference apparatus main body 6 and are supplied to the personal terminal 73 of the attendee 18d. That is, the control circuit compares each of the ID numbers added by the personal terminal respectively with the ID number which is input by the transmitting personal terminal for specifying a receiving personal terminal, and an information signal is sent to the specific personal terminal as a result of the comparison.

In the case where an attendee who wants to transmit a message exists in the other conference hall 3, a message and the ID numbers of the personal terminals 75 to 70 provided in the other conference hall 3 are input in a manner similar to that mentioned above.

The data comprising the ID numbers of the transmitting person and the receiving person and the message is processed by the television conference apparatus main body 6 of the conference hall 1 The video signal and the audio signal which are formed by the conference room terminal 8 and the personal terminal 7 and the message data combined with the ID numbers of the transmitting person and the receiving person are mixed by the control circuit (not shown) in the television conference apparatus main body 6. The mixed signal is encoded to the signal S2 by the codec of the television conference apparatus main body 6. The signal S2 is transmitted to the other conference hall system 4 through the interface 9 and the transmission line 5.

After the signal S2 is decoded by the codec of the television conference apparatus main body of the other conference hall system 4, the video signal, audio signal, message data, and data showing ID number are separated by the control circuit in the television conference apparatus main body of the other conference hall system 4.

The separated video signal and the audio signal are supplied to the conference room terminal, that is, to the monitor of a large screen and the speaker, and to each of the personal terminals 75 to 79 by the control circuit. Only the message data is supplied to an attendee who wants to transmit a message based on ID number, for example, the personal terminal 78 of the attendee 21d.

A control means can be provided in each of personal terminals, by which received information is monitored only when an individual ID number is equal to a received ID number as a result of a comparison.

A message 22 is displayed on only the monitor sections 11 of the personal terminal 73 and 78 of the attendees 18d and 21d who want to transmit the message together with the number indicating the transmitting person, denomination, and the like.

The attendees 18d and 21d who received the message can speak on the basis of the message or can transmit a message of the reply to the attendee 18a as a transmitting person by a procedure similar to that mentioned above. By providing the personal terminal 7 for the use as a secretary, for example, it is possible for the secretary to inform an attendee that is an emergency telephone call on an outside line. Due to this, the message can be transmitted to one or a plurality of specific attendees in a manner such that the message cannot be known by persons other than the specific attendees. The message can be exchanged between at least two arbitrary persons. Since the message can be transmitted to only the special attendees, the progress of the conference is not disturbed.

Although the embodiment has been described with respect to an example in which the same video image as that of the monitor 17 of the large screen is displayed on the monitor section 11 of the personal terminal 7, the invention is not limited to such an example. For example, the content written on a blackboard, materials, or the like can be picked up by a video camera and displayed on the monitor section 11 of the personal terminal 7.

On the other hand, although the embodiment has been described with respect to an example in which a message is displayed on the monitor section 11 of the personal terminal. 7, the invention is not limited to such an example. For example, a small monitor to display a message can be also provided separately from the personal terminal 7.

According to the television conference system in the invention, a personal terminal having at least an information input section and a monitor section and personal information monitor means for enabling information input from the information input section to be exchanged between at least arbitrary two persons are provided. Therefore, a particular attendee can send a message to one or more of special attendees in a manner such that the message cannot be known by persons other than the special attendees. There is an effect such that since a message can be transmitted to only specific attendees, the progress of the conference is not disturbed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A television conference system in which video information signals and audio information signals are transmitted between a first conference hall and a second conference hall, comprising:
   a) a first video camera for generating a first video information signal and a first microphone for generating a first audio information signal, the first video camera and the first microphone being provided in the first conference hall;
   b) a second video camera for generating a second video information signal and a second microphone for generating a second audio information signal, the second video camera and the second microphone being provided in the second conference hall;
   c) a first monitor means provided in the first conference hall, for reproducing the second video information signal and the second audio information signal;
   d) a second monitor means provided in the second conference hall, for reproducing the first video information signal and the second audio information signal;
   e) a plurality of personal terminals provided in the first and second conference halls, each one of the plurality of personal terminals including at least personal information input means, means for outputting a personal information signal addressed to one or more specified personal terminals among the plurality of personal terminals, and a monitor section for reproducing a given personal information signal received by the personal terminal, wherein each monitor section additionally displays one of the first video information signal or the second video information signal, and
   f) control mans for supplying personal information signals derived from any of the plurality of personal terminals to one or more specified personal terminals.

2. The system of claim 1, wherein each one of the plurality of personal terminals is assigned a different ID number and further includes ID number input means for inputting an ID number of the specified personal terminal, the ID number being a part of the personal information signal generated by each personal terminal.

3. The system of claim 2, wherein each one of the plurality of personal terminals adds its own ID number of the personal information signal and then transmits the personal information signal.

4. The system of claim 3, wherein the control means compares each of the ID numbers added to each of the personal information signals with the ID number of each one of the plurality of personal terminals, selects one or more personal terminals from among the plurality of personal terminals based on the comparison, and supplies the personal information signal to the selected personal terminals.

5. The system of claim 4, further comprising:
   a) transmitting means provided in the first conference hall, for mixing together and transmitting as an encoded signal the first video information signal, the first audio information signal, and personal information signals generated by the plurality of personal terminals provided in the first conference hall;

b) receiving mans provided in the second conference hall, for receiving the encoded signal from the transmitting means and for separating the first video information signal, the first audio information signal, and the personal information signals, whereby the separated personal information signals are supplied to the control means.

6. A television conference system in which video information and audio information are transmitted between a first conference hall and a second conference hall, comprising:

a) a first video camera and a first microphone provided in the first conference hall;

b) a second video camera and a second microphone provided in the second conference hall;

c) a first monitor means provided in the first conference hall, for reproducing the video information and the audio information sent from the second video camera and the second microphone, respectively;

d) a second monitor means provided in the second conference hall, for reproducing the video information and the audio information sent from the first video camera nd the first microphone, respectively;

e) a plurality of personal terminals provided in the first and second conference halls, each one of the plurality of personal terminals including at least personal information input means, means for outputting a personal information signal designated of a selected one of the plurality of personal terminals, and a monitor section for receiving and displaying the video information from the first video camera or the second video camera and the personal information signals designated for the personal terminal.

* * * * *